US008746113B2

(12) United States Patent
Davidson et al.

(10) Patent No.: US 8,746,113 B2
(45) Date of Patent: *Jun. 10, 2014

(54) UNIVERSAL JOINT COUPLING MECHANISM FOR DETACHABLY ENGAGING TOOL ATTACHMENTS

(75) Inventors: John B. Davidson, Chicago, IL (US); C. Robert Moon, Joliet, IL (US)

(73) Assignee: Joda Enterprises, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/247,324

(22) Filed: Sep. 28, 2011

(65) Prior Publication Data

US 2012/0036969 A1 Feb. 16, 2012

Related U.S. Application Data

(63) Continuation of application No. 12/315,260, filed on Dec. 1, 2008, now Pat. No. 8,047,103, which is a continuation of application No. PCT/US2007/011344, filed on May 10, 2007.

(60) Provisional application No. 60/810,239, filed on Jun. 2, 2006.

(51) Int. Cl.
*F16C 11/06* (2006.01)

(52) U.S. Cl.
USPC ........................ 81/177.85; 403/74; 81/177.75

(58) Field of Classification Search
USPC ........ 81/177.85, 177.2, 177.8, 177.7, 177.75; 403/74
See application file for complete search history.

(56) References Cited

U.S. PATENT DOCUMENTS

| | | | | |
|---|---|---|---|---|
| 1,864,466 | A | 6/1932 | Peterson | |
| 1,940,405 | A | 12/1933 | Englund | |
| 3,208,318 | A | 9/1965 | Roberts | |
| 3,220,755 | A * | 11/1965 | Gottschald et al. | 403/136 |

(Continued)

FOREIGN PATENT DOCUMENTS

| | | |
|---|---|---|
| DE | 38 04 129 | 9/1988 |
| EP | 1457291 | 9/2004 |
| WO | WO 9002634 A1 | 3/1990 |
| WO | WO 03047817 | 6/2003 |

OTHER PUBLICATIONS

International Search Report for corresponding International Application No. PCT/US2007/011344 dated Mar. 27, 2008 (two pages).

(Continued)

*Primary Examiner* — Hadi Shakeri
(74) *Attorney, Agent, or Firm* — Brinks Gilson & Lione; G. Peter Nichols

(57) ABSTRACT

A universal joint includes first and second parts interconnected by a coupling element, and a coupling mechanism for detachably engaging tool attachments such as sockets. The disclosed coupling mechanisms include an engaging element and an actuating element. The engaging element can include a pin, and the pin can be oriented either obliquely or longitudinally in the drive stud of the universal joint. The actuating element can include a collar and a central portion that crosses the central longitudinal axis of the drive stud. The central portion can be offset along the longitudinal axis toward the coupling element, and the actuating element can be configured to extend into an aperture formed by the coupling element and the second part of the universal joint.

29 Claims, 2 Drawing Sheets

(56) References Cited

U.S. PATENT DOCUMENTS

| | | | |
|---|---|---|---|
| 4,420,995 | A | 12/1983 | Roberts |
| 4,571,113 | A | 2/1986 | Coren |
| 4,614,457 | A | 9/1986 | Sammon |
| 4,768,405 | A | 9/1988 | Nickipuck |
| 4,770,073 | A | 9/1988 | Palm |
| 4,781,085 | A | 11/1988 | Fox, III |
| 4,848,196 | A | 7/1989 | Roberts |
| 5,214,986 | A | 6/1993 | Roberts |
| 5,233,892 | A | 8/1993 | Roberts |
| 5,289,745 | A | 3/1994 | Beardsley |
| 5,291,809 | A | 3/1994 | Fox, III et al. |
| 5,333,523 | A | 8/1994 | Palm |
| D355,342 | S | 2/1995 | Davidson et al. |
| D359,668 | S | 6/1995 | Roberts et al. |
| 5,433,548 | A | 7/1995 | Roberts et al. |
| 5,501,125 | A | 3/1996 | Roberts et al. |
| 5,644,958 | A | 7/1997 | Roberts et al. |
| 5,660,491 | A | 8/1997 | Roberts et al. |
| D397,597 | S | 9/1998 | Davidson et al. |
| 5,851,151 | A | 12/1998 | Reynolds |
| 5,911,800 | A | 6/1999 | Roberts et al. |
| 6,044,730 | A | 4/2000 | Roberts et al. |
| 6,098,500 | A | 8/2000 | Roberts et al. |
| 6,109,140 | A | 8/2000 | Roberts et al. |
| 6,145,416 | A | 11/2000 | Bonniot |
| 6,164,169 | A | 12/2000 | Goff |
| 6,182,536 | B1 | 2/2001 | Roberts et al. |
| 6,199,457 | B1 | 3/2001 | Hoff et al. |
| 6,205,890 | B1 | 3/2001 | Roberts et al. |
| 6,755,100 | B1 | 6/2004 | Chen |
| 6,920,810 | B1 | 7/2005 | Thompson et al. |
| 7,398,713 | B2 | 7/2008 | Davidson |
| 2005/0229752 | A1 | 10/2005 | Nickipuck |

OTHER PUBLICATIONS

Supplementary European Search Report for Corresponding Application No. EP 07776966 dated Sep. 28, 2009 (three pages).

International Search Report for International Application No. PCT/US2007/08950 dated Feb. 29, 2008 (2 pages).

* cited by examiner 12
148
146
130
132
120
142
14
118
116
100
28
104
D2
144
180
124
16
138
122
112
134
144
136
D1
10

130
184
136
120
118
124
110
102
28
122
100
30
104
116
182
180
114
16
112
14
12
10
D3

UNIVERSAL JOINT COUPLING MECHANISM FOR DETACHABLY ENGAGING TOOL ATTACHMENTS

RELATED APPLICATIONS

This application is a continuation of prior application Ser. No. 12/315,260, filed Dec. 1, 2008, now U.S. Pat. No. 8,047,103 which is a continuation of international application no. PCT/US2007/011344, filed May 10, 2007, which claims the benefit of U.S. Provisional Application No. 60/810,239, filed Jun. 2, 2006. The entire contents of each of the three above-identified documents are hereby incorporated herein by reference.

FIELD OF THE INVENTION

The present invention relates to mechanisms for altering engagement forces between a universal joint and a tool attachment.

BACKGROUND

Universal joints have in the past been provided with mechanisms for detachably engaging tool attachments. U.S. Pat. Nos. 5,660,491 (Roberts, et al.) and 5,433,548 (Roberts, et al.), assigned to the assignee of the present invention, disclose several versions of such mechanisms. Other mechanisms for universal joints are described in U.S. Pat. No. 4,614,457 (Sammon, see column 3, line 32), and U.S. Pat. No. 5,291,809 (Fox, III), as well as in US published patent application 2005/0229752 A1 (Nickipuck).

In addition, many mechanisms have been described for detachably engaging tool attachments to an extension bar, and extension bars are on occasion connected to universal joints. See, for example, the mechanisms disclosed in U.S. Pat. No. 4,848,196 (Roberts, et al.), U.S. Pat. No. 5,214,986 (Roberts, et al.), U.S. Pat. No. 5,233,892 (Roberts, et al.), U.S. Pat. No. 5,501,125 (Roberts, et al.), and U.S. Pat. No. 5,644,958 (Roberts, et al.), all assigned to the assignee of the present invention. Other such mechanisms are described in U.S. Pat. No. 4,781,085 (Fox, III) and U.S. Pat. No. 4,768,405 (Nickipuck).

SUMMARY

By way of introduction, the attached drawings show two different mechanisms for altering the engagement forces between the drive stud of a universal joint and a tool attachment. Both of these mechanisms include an actuating element and an engaging element, in which the actuating element extends across the universal joint near the coupling element of the universal joint. In one case the engaging element includes an obliquely-oriented pin, and in the other the engaging element includes a longitudinally-oriented pin. Both mechanisms are longitudinally compact, and they extend only a small distance beyond the outside diameter of the drive element.

The scope of the present invention is defined solely by the appended claims, which are not to be limited to any degree by the statements within this summary or the preceding background discussion.

BRIEF DESCRIPTION OF THE DRAWINGS

FIG. 1 shows the mechanism in an engaging position and FIG. 2 shows the mechanism in a releasing position.

FIG. 3 shows the mechanism in an engaging position and FIG. 4 shows the mechanism in a releasing position.

DETAILED DESCRIPTION OF PREFERRED EMBODIMENTS

Figure 1:
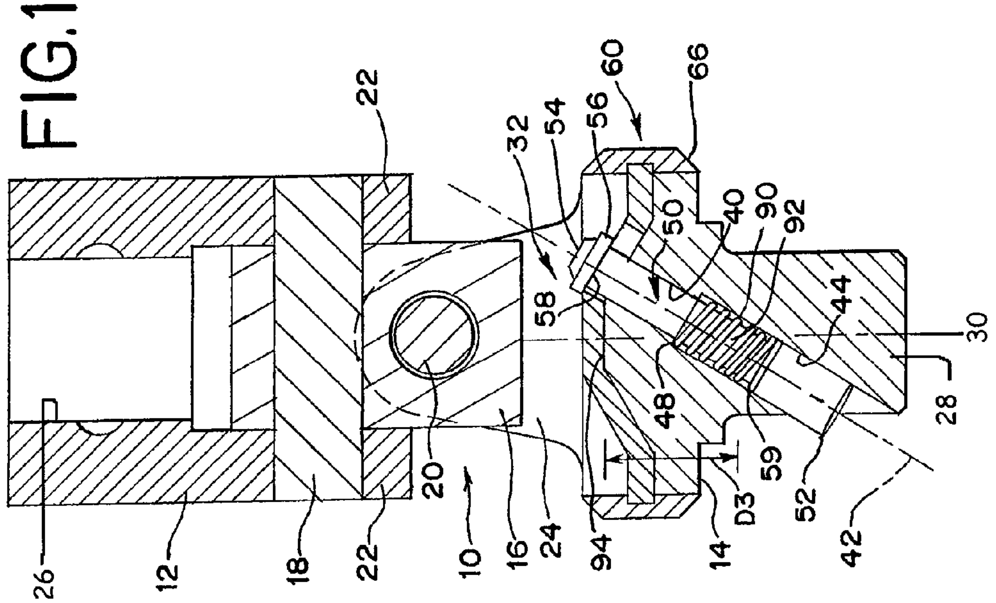

FIG. 1 shows a universal joint 10 that includes first and second parts 12, 14 interconnected by a coupling element 16. The coupling element 16 is pivotably connected to the first part 12 by a first pin 18 and to the second part 14 by a second pin 20. In this example, the first part 12 includes a pair of spaced arms 22, and the second part 14 includes a pair of spaced arms 24 (only one of which is shown in FIG. 1). The arms 22, 24 function as load-bearing protrusions that receive the coupling pins 18, 20, respectively and transmit torque between the coupling element 16 and the first and second parts 12, 14, respectively. The first part defines a socket 26 and the second part defines a drive stud 28. The socket 26 may have a different size or configuration than as illustrated, and the socket 26 is not required in all embodiments. If desired, the first part 12 can be provided with another structure for receiving torque, such as a handle similar to the handle of a breaker bar, for example, or an extension bar shaft, T-bar, or other tool or tool part The socket 26 is configured to couple the first part to any suitable torque transmitting tool, such as a wrench or an extension bar, for example. The drive stud 28 is configured for insertion into any suitable tool attachment, and it typically defines an out-of-round cross-section. For example, the drive stud 28 may have a square, hexagonal or other non-circular shape in cross section. The second part 14 will often define a circular cross section between the drive stud 28 and the arms 24, though this is not required. The drive stud 28 defines a central longitudinal axis 30, and the second part 14 cooperates with the coupling element 16 to define an aperture 32 that passes through the universal joint 10 between the coupling element 16 and the second part 14.

The first part 12 is free to pivot through a limited arc with respect to the coupling element 16 about the first pin 18, and the second part 14 is free to pivot through a limited arc with respect to the coupling element 16 about the second pin 20. These motions allow the universal joint 10 to rotate with the first part 12 positioned at a skew angle with respect to the second part. The arms 24 transmit torque between the coupling element 16 and the drive stud 28. The features of the universal joint 10 described above are conventional, and these features can be configured as described in greater detail in U.S. Pat. No. 5,433,548 (Roberts, et al.). For example, FIG. 1 of U.S. Pat. No. 5,433,548 is a perspective view that shows one possible relationship of the two spaced arms of the second part to the coupling element.

The universal joint 10 includes a mechanism for altering engagement forces between the universal joint 10 and a tool attachment, as described below. As used throughout this specification and the following claims, the term "tool attachment" refers to any attachment configured to be engaged by the drive stud 28, including but not limited to sockets, extension bars, certain ratchets, and the like.

Figure 2:
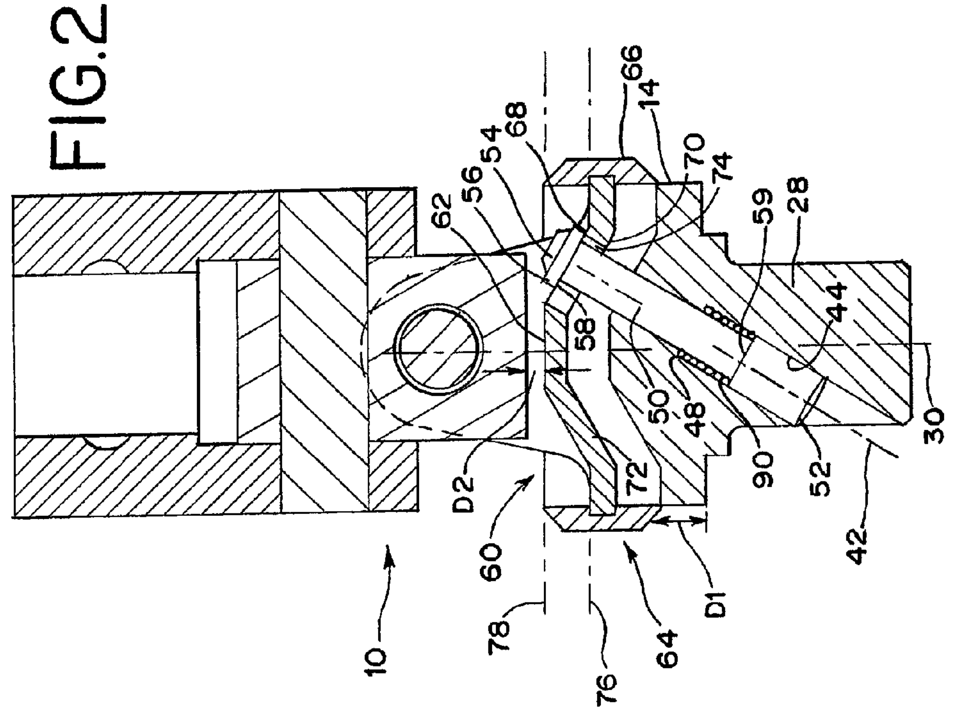
FIGS. 1 and 2 are longitudinal sectional views of a universal joint that includes a first preferred embodiment of a mechanism for altering engagement forces.

In the embodiment of FIGS. 1 and 2, the second part 14 includes a guide 40 that is oriented along a guide direction 42 extending at an oblique angle with respect to the longitudinal axis 30. Preferably the oblique angle between the axis 30 and the guide direction 42 is greater than 10 degrees. In this example, the guide includes an internal passageway 44 in the drive stud 28 and an internal shoulder 48. The internal passageway 44 is oriented at an oblique angle to the axis 30, and in general this oblique angle can be less than 80 degrees. As used herein and the following claims, an internal passageway in the drive stud is one that is surrounded by the drive stud for at least part of its length. Thus, an internal passageway in the drive stud is distinguished from a groove in the surface of the drive stud.

The illustrated mechanism further includes an engaging element 50 moveably disposed in the guide 40. The engaging element 50 of this example includes a pin having a lower end 52 and an upper end 54. The illustrated engaging element 50 includes a retainer 56 such as a split washer received in a groove in the upper end 54. As shown, the lower surface of the retainer 56 functions as a support surface 58 for the engaging element 50, as described below. Alternatively, the head of the engaging element may be shaped and/or enlarged to provide a support surface without an additional element such as the illustrated retainer 56. The engaging element 50 defines an external shoulder 59 between the lower and upper ends 52, 54.

As used throughout this specification and the following claims, the term "engaging element" refers to one or a plurality of coupled components, at least one of which is configured for releasably engaging a tool attachment. Thus, this term encompasses both single part engaging elements and multi-part-assemblies (including, for example, the multiple part engaging elements shown in FIGS. 4-6 of U.S. patent application Ser. No. 60/796,382, filed May 1, 2006 and assigned to the assignee of this invention). This related patent application is hereby incorporated by reference in its entirety, except that in the event of any inconsistency between the present specification and this related patent application, the present specification controls.

The primary function of the engaging element 50 is to hold a tool attachment on the drive stud 28 during normal use. The lower end 52 of the engaging element 50 is configured to engage a tool attachment when the engaging element 50 is in an engaging position, and to release the tool attachment when the engaging element 50 is in a releasing position. As used throughout this specification and the following claims, the term "engaging position" does not imply locking the tool attachment in place against all conceivable forces tending to dislodge the tool attachment.

Though illustrated as a cylindrically-symmetrical pin in FIGS. 1 and 2, the engaging element 50 may take various shapes. If desired, the engaging element 50 may be provided with an out-of-round cross section for some or all of its length, and the passageway 44 may define a complementary shape such that a preferred rotational orientation of the engaging element 50 in the passageway 44 is automatically obtained. That is, the engaging element 50 need not be rotatable in the passageway 44. The terminus of the lower end 52 of the engaging element 50 may be formed in any suitable shape and, for example, may be rounded as shown in U.S. Pat. No. 5,911,800, assigned to the assignee of the present invention.

The illustrated mechanism further includes an actuating element 60 which will be described in connection with FIG. 2 for clarity of illustration. The actuating element 60 in this preferred embodiment includes a central portion 62 which extends close to or actually across the axis 30 and a peripheral portion 64 which remains spaced from the axis 30. The peripheral portion 64 includes a pair of opposed sloping arms 70, 72 and a collar 66. The collar 66 fits closely around the second part 14, and the collar 66 slides longitudinally along a path that is essentially parallel to the axis 30. In this example, the collar 66 defines a groove that extends completely around an inner circumference of the collar, and the outer ends of the sloping arms 70, 72 are received within the groove. This arrangement allows the collar 66 to rotate freely with respect to the sloping arms 70, 72 and the second part 14. Alternatively, the collar 66 may be fixed to the sloping arms 70, 72 or the collar may engage the sloping arms 70, 72 with a different geometry. For example, the collar may define a shelf to engage the sloping arms 70, 72, and a retainer ring on the second part 14 may limit the stroke of the collar in one direction.

For any given collar design, the sloping arms 70, 72 are angled at an oblique angle with respect to the axis 30, and they serve to offset the central portion 62 relative to the collar 66 along the axis 30 such that the central portion 62 is further from the drive stud 28 in relation to the center of the collar annulus (measured along the axis 30) than it would be if the arms 70, 72 extended transversely to the axis 30. In FIG. 2, the reference number 76 designates a first plane transverse to the axis 30 that passes through the center of mass of the collar 66 when the actuating element 60 is in the raised position shown in FIG. 2. The reference number 78 designates a second plane transverse to the axis 30 that passes through the center of mass of the central portion 62 when the actuating element 60 is in the raised position of FIG. 2. Because of the offset provided by the sloping arms 70, 72, the second plane 78 and the drive stud 28 are positioned on opposite sides of the first plane 76.

The sloping arm 70 defines an elongated slot 74 that receives the upper end 54 of the engaging element 50. The upper surface of the sloping arm 70 adjacent the slot 74 functions as a support surface 68 that in this example engages the support surface 58 of the retainer 56. Also, in this example the support surface 68 is oriented substantially transversely to the guide direction 42, though this is not required. In many cases it will be preferable to orient the support surface 68 so that it is not parallel either to the axis 30 or to the guide direction 42.

As shown in FIGS. 1 and 2, the collar 66 extends around the outer circumferential periphery of the second part 14. It is to be understood that alternative structures may likewise be employed, including but not limited to those that extend only partially around a circumference and those that have a short longitudinal length.

Universal joints of the present invention preferably include at least one biasing element that provides automatic engagement with a tool attachment once the drive stud 28 has been inserted into the tool attachment. In some embodiments, such automatic engagement can operate after the exposed end of the engaging element 50 is pushed to a releasing position by a tool attachment as the drive stud 28 is inserted into the tool attachment. Automatic engagement can also be useful after the actuating element 60 has been used to move the engaging element 50 to a releasing position. In alternative embodiments in which engagement is to be manually initiated by an operator's movement of an actuating element, no biasing element may be required. In one alternative, a detent can be used to hold the actuating element in one or more positions, such as an engaging position and a releasing position.

The embodiment of FIGS. 1 and 2 includes a biasing element 90 that bears on the shoulders 48 and 59 to bias the engaging element 50 and the actuating element 60 to the engaging position shown in FIG. 1. The biasing element 90 defines a center of mass that lies within the second part 14. In this case the biasing element 90 biases the engaging element 50 by reacting against the second part 14. In this way, the biasing element 90 provides the desired biasing forces without engagement with the coupling element 16 and independent of any reaction against the coupling element 16.

Many versions of this invention provide a concealed biasing element (1) that is protected against outside influences such as foreign object or material that may otherwise obstruct operation of the mechanism, and (2) that is unlikely to result in fragments of the biasing element escaping from the universal joint 10 in the event that the biasing element should break apart in use. In this example, the biasing element 90 is a compression-type coil spring that surrounds the engaging element 50 and is positioned within the guide 40, though many other types of biasing elements can be used to perform the biasing functions described above. In alternate embodiments, the biasing element may be implemented in other forms, placed in other positions, bias the engaging element and the actuating element in other directions, and/or be integrated with or coupled directly to other components.

FIGS. 1 and 2 show the illustrated mechanism in two separate positions. The position of FIG. 1 is the normal rest position, in which the biasing element 90 holds the engaging element 50 and the actuating element 60 in the engaging position.

As shown in FIG. 2, when external forces are applied to move the collar 66 in a direction away from drive stud 28, the collar 66 moves the engaging element 50 obliquely upwardly in the view of FIGS. 1 and 2. This causes the lower end 52 of the engaging element 50 to move out of its engaging position (i.e., any position in which the terminus of the lower end 52 projects outwardly from drive stud 28 sufficiently to engage the tool attachment) and further into the passageway 44.

When external forces are removed and the collar 66 is allowed to move away from the position of FIG. 2, the biasing force of the biasing element 90 moves the engaging element 50 toward the position of FIG. 1.

When the drive stud 28 is simply pushed into a tool attachment, the tool attachment can push the engaging element 50 into the drive stud 28, compressing the biasing element 90 in the process.

In this example, the region of contact between the engaging element 50 and the actuating element 60 remains inside the periphery of the second part 14, and the collar 66 can be provided with an unusually small outer diameter for a given size of the drive stud 28, even though the engaging element 50 slides obliquely in the second part 14.

Figures 3, 4:
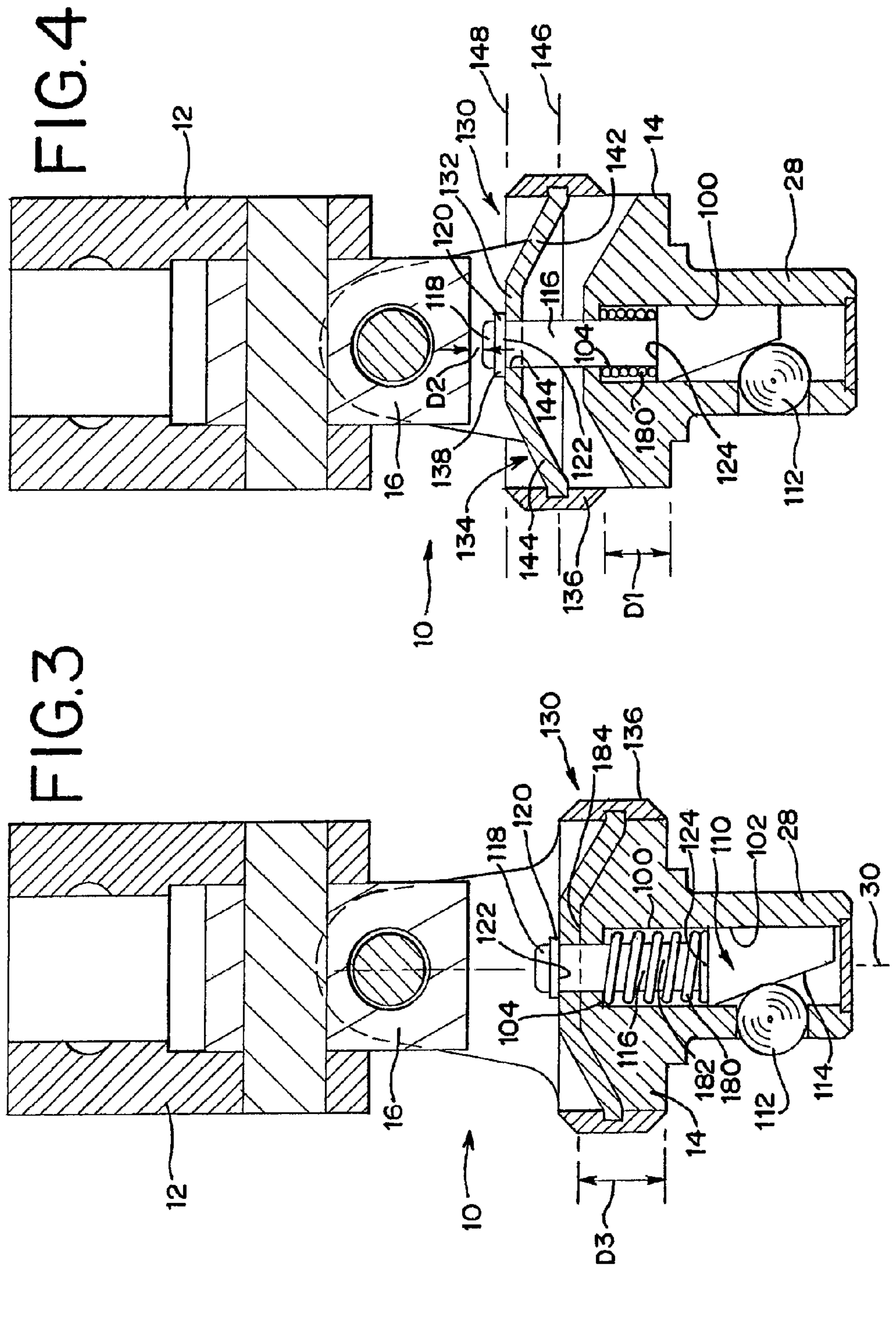
FIGS. 3 and 4 are longitudinal sectional views of a universal joint that includes a second preferred embodiment of a mechanism for altering engagement forces.

FIGS. 3 and 4 illustrate a second preferred embodiment of the present invention. The basic structure of the universal joint, identified by reference numbers within the range 10-32 in the description of FIGS. 1 and 2, is identical in the two embodiments and will not be described again. In this embodiment, the second part 14 includes a guide 100 that includes an internal passageway 102 in the drive stud 28 and an internal shoulder 104. The guide 100 and the internal passageway 102 are this example is oriented parallel to the central longitudinal axis 30.

An engaging element 110 is positioned in the guide 100, and this engaging element includes a ball 112, a ramp 114, and a shaft 116. The ramp 114 and the shaft 116 move as a unit and may be formed in one piece if desired. The ball 112 moves along the ramp 114 as the ramp 114 moves longitudinally in the guide 100. The upper end 118 of the shaft 116 defines a groove that receives a retainer 120, such as a split washer for example, and the underside of the retainer 120 forms a support surface 122. As discussed above, it is also possible to shape and/or enlarge the head of the upper end 118 to provide the support surface without the need for an additional part. The ramp 114 defines a shoulder 124 around the shaft 116.

Turning to FIG. 4 for clarity of illustration, an actuating element 130 includes a central portion 132 and a peripheral portion 134, and the peripheral portion 134 includes a collar 136 and a pair of sloping arms 142, 144. The actuating element 130 is similar to the actuating element 60 described above, except that there is no slot in the sloping arms 142, 144, and there is an opening 144 in the central portion 132. The upper end 118 of the shaft 116 passes through this opening 144. The central portion 132 forms a support surface 138 around the opening 144, and this support surface 138 engages the support surface 122 of the retainer 120 or other support surface of the engaging element.

As before, the sloping arms 142, 144 offset the central portion 132 toward the coupling element 16 and away from the drive stud 28, and a first plane 146 transverse to the axis 30 and passing through the center of mass of the collar 136 is positioned between a second plane 148 transverse to the axis 30 passing through the center of mass of the central portion 132 and the drive stud 28.

A biasing element 180 is positioned around the shaft 116 within the guide 100 to bear on the shoulders 104, 124. The biasing element 180 defines a center of mass that lies within the second part 14. In this case the biasing element 180 biases the engaging element 110 by reacting against the second part 14. In this way, the biasing element 180 provides the desired biasing forces without engagement with the coupling element 16 and independent of any reaction against the coupling element 16.

FIG. 3 shows the illustrated mechanism in the rest position, in which the biasing force of the biasing element 180 holds the engaging element 110 in a tool attachment engaging position. In this position the ball 112 extends outwardly from the drive stud 28 to engage a recess or bore in the socket of a tool attachment (not shown).

When an operator wishes to release a tool attachment, the collar 136 is moved away from the drive stud 28, thereby compressing the biasing element 180 and moving the ramp upwardly in the view of FIGS. 3 and 4, such that the ball 112 is free to move into the drive stud 28. In this way a tool attachment is released.

The embodiments illustrated in the figures both include actuating elements 60, 130 that are configured and positioned to minimize the overall length of the second part 14. The actuators 60, 130 are accessible from the periphery of the second part 14, and they include a central portion 62, 132 that crosses the central longitudinal axis 30. At least a portion of the actuating elements 60, 130 extends into the aperture 32 defined by the coupling element 16 and the second part 14, for at least some positions of the actuating element 60, 130. Similarly, at least some portion of the actuating elements 60, 130 extends between the load-bearing protruding elements 24 of the second part 14 for at least some positions of the actuating elements 60, 130.

Stated another way, the engaging element 50, 110 and/or the actuating element 60, 130 can be moved to a position that is close to the coupling element 16. With reference to FIGS. 2 and 4, the actuating element 60, 130 moves through a stroke that has a longitudinal length D1. At closest approach, the closer of the engaging element 50, 110 and the actuating element 60, 130 approaches the coupling element 16 to within a longitudinal distance D2. (In the event of contact between the closer of the engaging element 50, 110 and the actuating element 60, 130 and the coupling element 16, D2 equals zero.) D2 is preferably less than five times D1, more preferably less than two times D1, and most preferably less than D1.

As another measure of the longitudinal compactness of the illustrated designs, the center of mass of the engaging element is positioned close to the wall of the second part farthest from the drive stud when the engaging element is in the rest position. With reference to FIGS. 1 and 3, the center of mass 92, 182 of the engaging element 50, 110 is separated by a longitudinal distance D3 from the wall 94, 184 of the second part 14 crossing the longitudinal axis 30 that is farthest from the drive stud 28 that crosses the axis 30, respectively. D3 is preferably less than eight times D1 (FIGS. 2 and 4, respectively), more preferably less than five times D1, and most preferably less than three times D1.

Throughout this description and in the appended claims, the following definitions are to be understood:

The term "coupled" and various forms thereof are intended broadly to encompass both direct and indirect coupling. Thus, a first part is said to be coupled to a second part when the two parts are directly coupled (e.g. by direct contact or direct functional engagement), as well as when the first part is functionally engaged with an intermediate part which is in turn functionally engaged either directly or via one or more additional intermediate parts with the second part. Also, two parts are said to be coupled when they are functionally engaged (directly or indirectly) at some times and not functionally engaged at other times.

The term "engage" and various forms thereof, when used with reference to retention of a tool attachment, refer to the application of any forces that tend to hold a tool and a tool attachment together against inadvertent or undesired separating forces (e.g., such as may be introduced during use of the tool). It is to be understood, however, that engagement does not in all cases require an interlocking connection that is maintained against every conceivable type or magnitude of separating force.

The designations "upper" and "lower" used in reference to elements shown in the drawings are applied merely for convenience of description. These designations are not to be construed as absolute or limiting and may be reversed. For the sake of clarity, unless otherwise noted, the term "upper" generally refers to the side of an element that is further from a coupling end such as a drive stud. In addition, unless otherwise noted, the term "lower" generally refers to the side of an element that is closer to the coupling end.

The term "longitudinal" refers to directions that are generally parallel to the length direction of the drive stud. In the embodiments described above, the longitudinal direction is generally parallel to the longitudinal axis 30.

The term "element" includes both single-part components and multiple-part components. Thus, an element may be made up of two or more separate components that cooperate to perform the function of the element.

As used herein, movement of an element toward a position (e.g., engaging or releasing) or toward a particular component (e.g., toward or away from a drive stud) includes all manner of longitudinal motions, skewed motions, rotational motions, and combinations thereof.

The term "relative movement" as applied to translation between two parts refers to any movement whereby the center of mass of one part moves in relation to the center of mass of another part.

As used herein, the term "biasing element" refers to any device that provides a biasing force. Representative biasing elements include but are not limited to springs (e.g., elastomeric or metal springs, torsion springs, coil springs, leaf springs, tension springs, compression springs, extension springs, spiral springs, volute springs, flat springs, and the like), detents (e.g., spring-loaded detent balls, cones, wedges, cylinders, and the like), pneumatic devices, hydraulic devices, and the like, and combinations thereof.

The tools described above are characterized in varying degrees by some or all of the following features: simple construction; a small number of easily manufactured parts; easy access to an operator using the tool in a tight and/or restricted workspace; rugged, durable, and reliable construction; an ability to accommodate various tool attachments, including those with various sizes and configurations of recesses designed to receive a detent; self adjusting for wear; substantially eliminating any precise alignment requirements; readily cleanable; presenting a minimum of snagging surfaces; extending outwardly from the tool by a small amount; and having a short longitudinal length.

The mechanisms illustrated in the drawings include actuating elements that have a maximum cross-sectional dimension that is only slightly larger that that of the second part on which they are mounted. Such an actuating element brings several advantages. Since the actuating element has a small outside diameter, the resulting tool is compact and easily used in tight spaces. Also, the actuating element is less subject to being accidentally moved to the releasing position during use, because it presents a smaller cross-section than many tool attachments.

Of course, it should be understood that a wide range of changes and modifications can be made to the preferred embodiments described above. For example, the actuating element may employ only one sloping arm rather than the pair of opposed sloping arms illustrated. Also, for convenience various positions of the engaging elements and the actuating elements have been described. It will of course be understood that the term "position" is intended to encompass a range of positions, as is appropriate for tool attachments that have recesses and bores of varying shapes and dimensions.

It is therefore intended that the foregoing detailed description be regarded as illustrative rather than limiting, and that it be understood that it is the following claims, including all equivalents, which are intended to define the scope of this invention.

We claim:

1. In a universal joint for use with a torque transmitting tool, said universal joint comprising a first part, a second part comprising a drive stud, and at least one coupling element coupled between the first and second parts, said at least one coupling element configured to transmit torque between the first and second parts, the improvement comprising:

a guide in the second part oriented at an oblique angle with respect to a central longitudinal axis of the drive stud;

an engaging element movably mounted in the guide to extend out of the drive stud and engage a tool attachment when in an engaging position and to release the tool attachment when in a releasing position;

an actuating element coupled with the engaging element such that for at least some positions of the engaging element, longitudinal movement of the actuating element with respect to the second part necessarily results in movement of the engaging element to the releasing position;

said actuating element crossing the central longitudinal axis and including a peripheral portion and a central portion, said peripheral portion oriented at least in part at an oblique angle with respect to the longitudinal axis of the drive stud and comprising a first sloping arm extending at an oblique angle away from the central portion.

2. In a universal joint for use with a torque transmitting tool, said universal joint comprising a first part, a second part comprising a drive stud, and at least one coupling element coupled between the first and second parts, said at least one coupling element configured to transmit torque between the first and second parts, the improvement comprising:

a guide in the second part oriented at an oblique angle with respect to a central longitudinal axis of the drive stud;

an engaging element movably mounted in the guide to extend out of the drive stud and engage a tool attachment when in an engaging position and to release the tool attachment when in a releasing position;

an actuating element coupled with the engaging element such that for at least some positions of the engaging element, movement of the actuating element with respect to the second part necessarily results in movement of the engaging element to the releasing position, said actuating element including a peripheral portion and a central portion, said peripheral portion oriented at least in part at an oblique angle with respect to the longitudinal axis of the drive stud and comprising a first sloping arm extending at an oblique angle away from the central portion;

said second part comprising at least two load-bearing protrusions configured to participate in torque transmission between the coupling element and the second part, at least part of said actuating element extending between the load-bearing protrusions for at least some positions of the actuating element.

3. In a universal joint for use with a torque transmitting tool, said universal joint comprising a first part, a second part comprising a drive stud, and at least one coupling element coupled between the first and second parts, said at least one coupling element configured to transmit torque between the first and second parts, the improvement comprising:

a guide in the second part oriented at an oblique angle with respect to a central longitudinal axis of the drive stud; an engaging element movably mounted in the guide to extend out of the drive stud and engage a tool attachment when in an engaging position and to release the tool attachment when in a releasing position;

an actuating element coupled with the engaging element such that for at least some positions of the engaging element, movement of the actuating element with respect to the second part necessarily results in movement of the engaging element to the releasing position, said actuating element including a peripheral portion and a central portion, said peripheral portion oriented at least in part at an oblique angle with respect to the longitudinal axis of the drive stud and comprising a first sloping arm extending at an oblique angle away from the central portion;

said coupling element and said second part cooperating to form an aperture, at least part of said actuating element extending into the aperture for at least some positions of the actuating element.

4. The invention of claim 1, 2, or 3 wherein the actuating element comprises a collar extending around the second part.

5. The invention of claim 1, 2, or 3 wherein engaging element moves along a first direction in the guide, wherein the actuating element comprises a support surface near the engaging element, and wherein the support surface is oriented non-parallel to the first direction and non-parallel to the central longitudinal axis.

6. The invention of claim 5 wherein the support surface is oriented substantially perpendicularly to the first direction.

7. The invention of claim 5 wherein the engaging element comprises a second support surface positioned to engage the first-named support surface of the actuating element.

8. The invention of claim 1, 2, or 3 wherein the actuating element is accessible from a periphery of the second part and crosses the central longitudinal axis.

9. The invention of claim 1, 2, or 3 wherein the peripheral portion further comprises a second sloping arm extending at an oblique angle away from the central portion.

10. The invention of claim 9 wherein the first and second arms are positioned on opposite sides of the central portion.

11. The invention of claim 1, 2, or 3 wherein the actuating element is coupled to the engaging element at the peripheral portion.

12. The invention of claim 1, 2, or 3 further comprising a biasing element operative to bias the actuating element toward a rest position while remaining free of engagement with the coupling element.

13. The invention of claim 1 or 3 wherein the second part comprises two spaced arms positioned on respective sides of the coupling element, and wherein at least some part of the actuating element extends between the two spaced arms, for at least some positions of the actuating element with respect to the second part.

14. In a universal joint for use with a torque transmitting tool, said universal joint comprising a first part, a second part comprising a drive stud, and at least one coupling element coupled between the first and second parts, said at least one coupling element configured to transmit torque between the first and second parts, the improvement comprising:

a guide in the second part; an engaging element movably mounted in the guide to extend out of the drive stud and engage a tool attachment when in an engaging position and to release the tool attachment when in a releasing position;

an actuating element comprising a collar extending around the second part, the actuating element coupled with the engaging element such that for at least some positions of the engaging element, longitudinal movement of the actuating element with respect to the second part results in movement of the engaging element;

said actuating element comprising a peripheral portion and a central portion, said peripheral portion positioned away from the drive stud and oriented at least in part at an oblique angle with respect to a central longitudinal axis of the drive stud, wherein the peripheral portion comprises a first sloping arm extending at an oblique angle between the collar and the central portion; said actuating element crossing the central longitudinal axis and coupled to the engaging element at the peripheral portion.

15. In a universal joint for use with a torque transmitting tool, said universal joint comprising a first part, a second part comprising a drive stud, and at least one coupling element coupled between the first and second parts, said at least one coupling element configured to transmit torque between the first and second parts, the improvement comprising:

a guide in the second part; an engaging element movably mounted in the guide to extend out of the drive stud and engage a tool attachment when in an engaging position and to release the tool attachment when in a releasing position;

an actuating element comprising a collar extending around the second part, the actuating element coupled with the engaging element such that for at least some positions of the engaging element, movement of the actuating element with respect to the second part results in movement of the engaging element;

said actuating element comprising a peripheral portion and a central portion, said peripheral portion positioned away from the drive stud and oriented at least in part at an oblique angle with respect to a central longitudinal axis of the drive stud, wherein the peripheral portion comprises a first sloping arm extending at an oblique angle between the collar and the central portion and coupled to the engaging element at the peripheral portion;

said second part comprising at least two load-bearing protrusions configured to participate in torque transmission between the coupling element and the second part, at least part of said actuating element extending between the load-bearing protrusions for at least some positions of the actuating element.

16. In a universal joint for use with a torque transmitting tool, said universal joint comprising a first part, a second part comprising a drive stud, and at least one coupling element coupled between the first and second parts, said at least one coupling element configured to transmit torque between the first and second parts, the improvement comprising:

a guide in the second part; an engaging element movably mounted in the guide to extend out of the drive stud and engage a tool attachment when in an engaging position and to release the tool attachment when in a releasing position;

an actuating element comprising a collar extending around the second part, the actuating element coupled with the engaging element such that for at least some positions of the engaging element, movement of the actuating element with respect to the second part results in movement of the engaging element;

said actuating element comprising a peripheral portion and a central portion, said peripheral portion positioned away from the drive stud and oriented at least in part at an oblique angle with respect to a central longitudinal axis of the drive stud, wherein the peripheral portion comprises a first sloping arm extending at an oblique angle between the collar and the central portion and coupled to the engaging element at the peripheral portion;

said coupling element and said second part cooperating to form an aperture, at least part of said actuating element extending into the aperture for at least some positions of the actuating element.

17. The invention of claim 14, 15, or 16 wherein the central portion is offset away from the drive stud along the central longitudinal axis by the peripheral portion.

18. The invention of claim 14, 15, or 16 wherein the collar is centered on a first plane oriented transversely to the longitudinal axis of the drive stud when the actuating element is in a first position with respect to the second part.

19. The invention of claim 18 wherein the central portion is centered on a second plane oriented transversely to the longitudinal axis when the actuating element is in the first position.

20. The invention of claim 19 wherein the drive stud and the second plane are positioned on opposite sides of the first plane.

21. The invention of claim 14, 15, or 16 wherein the peripheral portion further comprises a second sloping arm extending at an oblique angle between the collar and the central portion.

22. The invention of claim 21 wherein the first and second arms are positioned on opposite sides of the central portion.

23. The invention of claim 14, 15, or 16 further comprising a biasing element operative to bias the actuating element toward a rest position while remaining free of engagement with the coupling element.

24. The invention of claim 14 or 16 wherein the second part comprises two spaced arms positioned on respective sides of the coupling element, and wherein at least some part of the actuating element extends between the two spaced arms, for at least some positions of the actuating element with respect to the second part.

25. The invention of claim 1, 2, 3, 14, 15, or 16 wherein said actuating element is movable with respect to the second part through a stroke having a longitudinal length D1, and said second part configured such that at closest approach the closer of the actuating element and the engaging element approaches the coupling element to within a longitudinal distance D2, wherein D2 is less than five times D1.

26. The invention of claim 1, 2, 3, 14, 15, or 16 wherein said actuating element is movable with respect to the second part through a stroke having a longitudinal length D1, said second part comprising a wall crossing the central longitudinal axis farthest from the drive stud, said center of mass spaced from the wall by a longitudinal distance D3 when the engaging element is in a rest position, wherein D3 is less than eight times D1.

27. In a universal joint for use with a torque transmitting tool, said universal joint comprising a first part, a second part comprising a drive stud, and at least one coupling element coupled between the first and second parts, said at least one coupling element configured to transmit torque between the first and second parts, the improvement comprising:

a guide in the second part oriented at an oblique angle with respect to a central longitudinal axis of the drive stud;

an engaging element movably mounted in the guide to extend out of the drive stud and engage a tool attachment when in an engaging position and to release the tool attachment when in a releasing position;

an actuating element coupled with the engaging element such that for at least some positions of the engaging element, longitudinal movement of the actuating element with respect to the second part necessarily results in movement of the engaging element to the releasing position;

said actuating element crossing the central longitudinal axis and including a peripheral portion and a central portion, said peripheral portion oriented at least in part at an oblique angle with respect to the longitudinal axis of the drive stud, wherein the actuating element is coupled to the engaging element at the peripheral portion.

28. In a universal joint for use with a torque transmitting tool, said universal joint comprising a first part, a second part comprising a drive stud, and at least one coupling element coupled between the first and second parts, said at least one coupling element configured to transmit torque between the first and second parts, the improvement comprising:

a guide in the second part oriented at an oblique angle with respect to a central longitudinal axis of the drive stud;

an engaging element movably mounted in the guide to extend out of the drive stud and engage a tool attachment when in an engaging position and to release the tool attachment when in a releasing position;

an actuating element coupled with the engaging element such that for at least some positions of the engaging element, movement of the actuating element with respect to the second part necessarily results in movement of the engaging element to the releasing position, said actuating element including a peripheral portion and a central portion, said peripheral portion oriented at least in part at an oblique angle with respect to the longitudinal axis of the drive stud, wherein the actuating element is coupled to the engaging element at the peripheral portion;

said second part comprising at least two load-bearing protrusions configured to participate in torque transmission between the coupling element and the second part, at least part of said actuating element extending between the load-bearing protrusions for at least some positions of the actuating element.

29. In a universal joint for use with a torque transmitting tool, said universal joint comprising a first part, a second part comprising a drive stud, and at least one coupling element coupled between the first and second parts, said at least one coupling element configured to transmit torque between the first and second parts, the improvement comprising:

a guide in the second part oriented at an oblique angle with respect to a central longitudinal axis of the drive stud; an engaging element movably mounted in the guide to extend out of the drive stud and engage a tool attachment when in an engaging position and to release the tool attachment when in a releasing position;

an actuating element coupled with the engaging element such that for at least some positions of the engaging element, movement of the actuating element with respect to the second part necessarily results in movement of the engaging element to the releasing position, said actuating element including a peripheral portion and a central portion, said peripheral portion oriented at least in part at an oblique angle with respect to the longitudinal axis of the drive stud, wherein the actuating element is coupled to the engaging element at the peripheral portion;

said coupling element and said second part cooperating to form an aperture, at least part of said actuating element extending into the aperture for at least some positions of the actuating element.

* * * * *